(12) United States Patent  
Chen et al.

(10) Patent No.: US 9,202,088 B2
(45) Date of Patent: Dec. 1, 2015

(54) METHOD AND APPARATUS FOR SELECTING REFERENCE TAG USED FOR POSITIONING

(71) Applicant: Huawei Technologies Co., Ltd., Shenzhen, Guangdong (CN)

(72) Inventors: Ai Chen, Shenzhen (CN); Lujia Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

(21) Appl. No.: 13/687,823

(22) Filed: Nov. 28, 2012

(65) Prior Publication Data

US 2013/0088334 A1   Apr. 11, 2013

Related U.S. Application Data

(63) Continuation of application No. PCT/CN2011/083513, filed on Dec. 6, 2011.

(30) Foreign Application Priority Data

Feb. 24, 2011   (CN) .......................... 2011 1 0044752

(51) Int. Cl.
*G06K 7/00* (2006.01)
*G01S 5/02* (2010.01)
*H04W 64/00* (2009.01)

(52) U.S. Cl.
CPC ................ *G06K 7/00* (2013.01); *G01S 5/0284* (2013.01); *H04W 64/00* (2013.01)

(58) Field of Classification Search
CPC .................. G06K 2017/0045; G06K 7/10366; G06K 19/0723; G01S 5/0252; G01S 5/14; G01S 13/878; G01S 13/876; G01S 11/06

USPC .......................... 340/10.1–10.6, 572.1–572.9
See application file for complete search history.

(56) References Cited

U.S. PATENT DOCUMENTS 6,362,731 B1 *   3/2002   Lill .............................. 340/445
2007/0287399 A1   12/2007   Lee
2012/0127976 A1 *   5/2012   Lin et al. ....................... 370/338

FOREIGN PATENT DOCUMENTS

CN   101131432 A   2/2008
CN   101191833 A   6/2008

(Continued)

OTHER PUBLICATIONS

Chinese Search Report dated Nov. 28, 2012 in connection with Chinese Patent Application No. 201110044752.4.

(Continued)

*Primary Examiner* — James Yang

(57) ABSTRACT

A method and an apparatus for selecting a reference tag used for positioning are provided. The method includes: obtaining first signal strength emitted by a reference tag and second signal strength emitted by a tag to be positioned, where the first signal strength and the second signal strength are detected by each radio frequency reader; comparing the first signal strength with the second signal strength to determine a boundary of the radio frequency readers, and dividing a network into a first area and a second area with the boundary; determining an estimated direction of the tag to be positioned relative to the reference tag according to a relative position of the reference tag and the boundary; and according to the estimated direction and according to the specified number of reference tags, selecting a valid reference tag group as the reference tag used for positioning.

13 Claims, 7 Drawing Sheets

(56) References Cited

FOREIGN PATENT DOCUMENTS

| | | |
|---|---|---|
| CN | 101349745 A | 1/2009 |
| CN | 101363910 | 2/2009 |
| CN | 102111876 A | 6/2011 |
| KR | 10-0735397 | 6/2007 |

OTHER PUBLICATIONS

International Search Report dated Mar. 22, 2012 in connection with International Patent Application No. PCT/CN2011/083513.

Guang-yao Jin, et al., "An Indoor Localization Mechanism Using Active RFID Tag", Proceedings of the IEEE International Conference on Sensor Networks, Ubiquitous, and Trustworthy Computing (SUTC'06), 2006 IEEE, 4 pages.

Lionel M. Ni, et al., "LANDMARC: Indoor Location Sensing Using Active RFID", Proceedings of the First IEEE International Conference on Pervasive Computing and Communications (PerCom'03), 2003 IEEE, 9 pages.

\* cited by examiner

METHOD AND APPARATUS FOR SELECTING REFERENCE TAG USED FOR POSITIONING

CROSS-REFERENCE TO RELATED APPLICATIONS

This application is a continuation of International Application No. PCT/CN2011/083513, filed on Dec. 6, 2011, which claims priority to Chinese Patent Application No. 201110044752.4, filed on Feb. 24, 2011, both of which are hereby incorporated by reference in their entireties.

TECHNICAL FIELD

The present invention relates to the field of wireless sensor technologies, and in particular, to a method and an apparatus for selecting a reference tag used for positioning.

BACKGROUND

A wireless sensor network is formed by a large number of low-cost micro-sized sensor nodes deployed in a monitored area, and is a multi-hop self-organized network system that is formed in a wireless communication manner. Its objective is to collaboratively sense, collect and process information of a sensed object in a network coverage area and send the information to an observer. In the wireless sensor network, position information is of vital importance for a detecting activity of the sensor network. To determine a position where an event occurs or to obtain a node position of a message is one of the most basic functions of the sensor network, which plays a key role for the validity of a sensor network application.

Currently, a variety of positioning methods of the wireless sensor network exist, and among them a relatively common method is a positioning method based on a signal attenuation model. A basic principle of positioning performed by this method is that energy attenuates as an electromagnetic wave propagates in a space, and its attenuation amplitude is related to a propagation distance. Therefore, according to an attenuation degree of the energy of a radio wave, a distance between an emission source and a receiver may be estimated. If a position of the receiver is known, the estimated distance may be used to position the emission source. This positioning method can achieve good positioning performance in a laboratory. However, in an actual environment, conditions, such as a temperature, an obstruction, and a propagation mode, are often changing and unpredictable. Therefore, a method of simply converting measured received power into a propagation path of the electromagnetic wave through a model brings a relatively large error.

Therefore, in the prior art, a manner of a reference tag is introduced to perform assisted positioning. The reference tag refers to a node of a known and fixed position in the sensor network. For example, a LANDMARC positioning technology is a typical application of using the reference tag to perform assisted positioning. In the LANDMARC positioning technology, a certain number of radio frequency (Radio Frequency, RF) readers and a certain number of reference tags need to be deployed in a network. When positioning is performed, firstly, signal strength emitted by each reference tag and a tag to be positioned may be detected by the RF readers. Then a distance from each reference tag to the tag to be positioned is estimated according to the detected signal strength, and several (for example, three) reference tags closest to the tag to be positioned are selected as valid reference tags. Finally, a position of the tag to be positioned is determined inside a polygonal area formed by using the several valid reference tags as vertexes.

This implementation manner of performing assisted positioning by introducing the reference tag may reduce an influence of external conditions, and is more suitable for positioning in the actual environment. However, the achieving of relatively high positioning accuracy depends on deployment density of the reference tag.

SUMMARY

The present invention provides a method and an apparatus for selecting a reference tag used for positioning, which implement relatively high positioning accuracy without depending on deployment density of the reference tag.

The present invention provides the following solutions.

A method for selecting a reference tag used for positioning includes:

obtaining first signal strength emitted by the reference tag and second signal strength emitted by a tag to be positioned, where the first signal strength and the second signal strength are detected by each radio frequency reader;

comparing the first signal strength with the second signal strength to determine a boundary of the radio frequency readers, and dividing a network into a first area and a second area with the boundary;

determining an estimated direction of the tag to be positioned relative to the reference tag according to a relative position of the reference tag and the boundary; and according to the estimated direction and according to the specified number of reference tags, selecting a valid reference tag group as the reference tag used for positioning.

An apparatus for selecting a reference tag used for positioning includes:

a signal strength obtaining unit, configured to obtain first signal strength emitted by a reference tag and second signal strength emitted by a tag to be positioned, where the first signal strength and the second signal strength are detected by each radio frequency reader;

a boundary determining unit, configured to compare the first signal strength with the second signal strength to determine a boundary of the radio frequency readers, and divide a network into a first area and a second area with the boundary;

an estimated direction determining unit, configured to determine an estimated direction of the tag to be positioned relative to the reference tag according to a relative position of the reference tag and the boundary; and a reference tag selecting unit, configured to, according to the estimated direction and according to the specified number of reference tags, select a valid reference tag group as the reference tag used for positioning.

According to the embodiments of the present invention, the present invention discloses the following technical effects:

in the embodiments of the present invention, firstly, the estimated direction of the tag to be positioned relative to each reference tag may be determined, and afterwards, when the valid reference tag group is selected, the estimated direction of the tag to be positioned relative to each reference tag may be used to perform the selection, and then the valid reference tag group is used to position the tag to be positioned. Therefore, for the position of the tag to be positioned, where the position is positioned by using the reference tag obtained in this reference tag selecting manner, its positioning accuracy does not depend on the deployment density of the reference tag. Even in a situation that the deployment density of the reference tag is relatively low, the relatively high positioning accuracy can still be achieved.

BRIEF DESCRIPTION OF THE DRAWINGS

To illustrate the technical solutions according to the embodiments of the present invention or in the prior art more clearly, the accompanying drawings required for describing the embodiments are introduced briefly in the following. Apparently, the accompanying drawings in the following description are some embodiments of the present invention, and persons of ordinary skill in the art can further derive other drawings based on these accompanying drawings without creative efforts.

DETAILED DESCRIPTION

The technical solutions in the embodiments of the present invention are clearly and completely described in the following with reference to the accompanying drawings in the embodiments of the present invention. Apparently, the embodiments to be described are a part of the embodiments of the present invention rather than all of the embodiments. All other embodiments obtained by persons of ordinary skill in the art based on the embodiments of the present invention should fall within the protection scope of the present invention.

Figures 1, 2A, 2B:
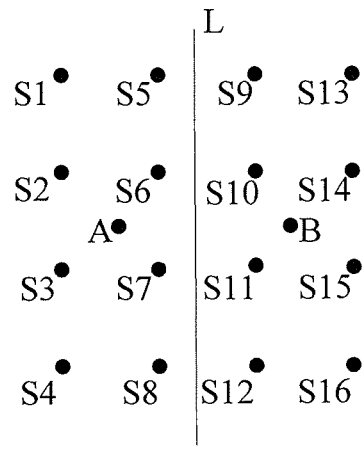
FIG. 1 is a schematic diagram of wireless sensor network deployment.
FIGS. 2(a), 2(b), and 2(c) are schematic diagrams of a process of determining an estimated direction according to an embodiment of the present invention.

In an implementation process of the present invention, the inventor finds that: in a network deployment diagram shown in FIG. 1, it is assumed that A is a reference tag, B is a tag to be positioned, S1 to S16 are RF readers, and a straight line L is a perpendicular bisector of $\overrightarrow{AB}$. And then, RF readers S1 to S8 on the left of the straight line L are relatively close to the reference tag A, and RF readers S9 to S16 on the right of the straight line L are relatively close to the tag to be positioned B. If it is assumed that M1 to M16 are differences between signal strength of the reference tag A and that of the tag to be positioned B, where the signal strength of A and B is received by S1 to S16, in an ideal situation, M1 to M8 should be greater than 0, and M9 to M16 should be less than 0.

Based on the foregoing characteristic, in an embodiment of the present invention, when a valid reference tag is determined, the following method may be adopted:

Firstly, for the reference tag A, signal strength of the reference tag A and that of the tag to be positioned which are received by the RF reader are determined, and a difference between the former and the latter is computed and is assumed as M. Since each RF reader is located at different positions, values of the M computed according to different RF readers are different, and some are positive values and some are negative values. Then a boundary of the RF readers is determined according to the positive values and the negative values of the M, so that values of the M on one side of the boundary are positive, and those on the other side are negative. That is, a whole space is divided into two areas with the boundary. One area is an area of positive values, and the other area is an area of negative values. Moreover, the reference tag A is definitely located in the area of positive values.

Then an approximate direction of the tag to be positioned relative to the reference tag may be estimated according to a position relationship between the reference tag A and the boundary. For example, the foregoing boundary of the RF readers is generally a straight line, and a radial perpendicular to the boundary and pointing to the area of negative values may be drawn from the reference tag A. An extending direction of the radial may be used as an estimated direction of the tag to be positioned relative to the reference tag A. Definitely, in another embodiment, a radial forming a specified angle with the boundary and pointing to the area of negative values may also be drawn from the reference tag A, and an extending direction of the radial is used as the estimated direction of the tag to be positioned relative to the reference tag A.

Likewise, similar processing may also be done for another reference tag in the network. In this way, estimated directions of the tag to be positioned relative to each reference tag may be estimated.

In order to understand more vividly the foregoing method for determining the estimated direction of the tag to be positioned relative to the reference tag, more detailed description is made with FIG. 2 in the following. In FIG. 2, likewise, it is assumed that 16 RF readers S1 to S16 exist. It is assumed that signal strength which is of the reference tag A and is received by the RF reader S1 is $M_{1A}$, and received signal strength of the tag to be positioned B is $M_{1B}$, $M_1=M_{1A}-M_{1B}$. It is assumed that $M_1>0$, it may be represented by "+" at the position of S1. Likewise, similar processing may also be done for another RF reader. That is, for an RF reader $S_n$ (n=1, 2, ..., 16), signal strength which is of the reference tag A and is received by the $S_n$ may be computed and is $M_{nA}$, received signal strength of the tag to be positioned B is $M_{nB}$, and $M_n=M_{nA}-M_{nB}$. For different RF readers, values of $M_n$ vary from positive to negative. For example, for an RF reader S14, $M_{14}<0$, may be represented by "−" at the RF reader S14.

It is assumed that positive and negative values of the $M_n$ are as shown in FIG. 2(a), when the boundary of the RF readers is determined, which may be as shown in FIG. 2(b), the straight line L may be used as the boundary of the RF readers.

Figure 2C:
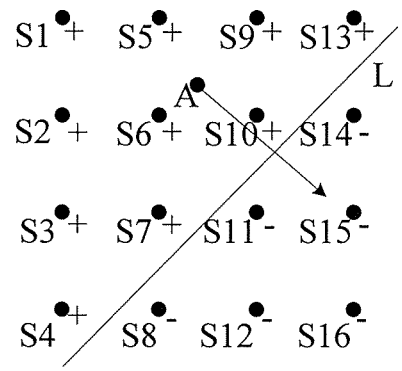

It can be seen that "+" is used to represent the positions of the RF readers on one side of the straight line L. Therefore, the area is referred to as the area of positive values, and the reference tag A is located in the area of positive values. "−" is used to represent the position of the RF readers on the other side of the straight line L. Therefore, the area is referred to as the area of negative values, and the tag to be positioned should be located in the area of negative values. Next, a radial perpendicular to the straight line L and pointing to the area of negative values may be drawn from the reference tag A. As shown in FIG. 2(c), an extending direction of the radial may be used as the estimated direction of the tag to be positioned relative to the reference tag A. Similar processing may also be done for another reference tag. Definitely, when an estimated direction is determined, the foregoing manner is not necessarily used. For example, a radial forming a preset angle with the straight line L and pointing to the area of negative values may also be drawn from the reference tag A. Various other manners are not described here again.

Specific determination of the boundary may be performed as follows:

Midpoints of straight lines connecting all adjacent RF readers which are marked as positive and negative are found, then multiple straight lines may be obtained through any two of these midpoints, and a functional relation of every straight line may be obtained. An optimal straight line may be found among these straight lines, so that marks of the RF readers on the two sides of the straight line are opposite. The optimal straight line may be used as the boundary of the RF readers. That is, since coordinates of the RF readers are known, in the specific implementation, the boundary of the RF readers may be represented by a functional relation. The foregoing "line-drawing" process is equivalent to a process of obtaining the functional relation. Accordingly, the estimated direction of the tag to be positioned relative to the reference tag actually is also equivalent to a radial. Since coordinates of the reference tag is also known, a manner of a functional relation may also be used to represent the foregoing estimated direction.

For example, it is assumed that a functional relation of the obtained boundary is $y=ax+b$, where a and b are constants, and it is assumed that the coordinates of the reference tag are $(x1, y1)$. It is equivalent to that the following conditions are known: a straight line where the estimated direction lies passes through a point $(x1, y1)$, and is perpendicular to a straight line $y=ax+b$. According to the two conditions, a functional relation of the straight line where the estimated direction lies may be obtained. For example, it is assumed that $y=cx+d$, for the estimated direction, if a concept of direction is to be embodied, a value of x may be restricted. For example, for a position relationship between the reference tag and the boundary shown in FIG. 2(b), a finally determined estimated direction of the tag to be positioned relative to the reference tag may be represented as: $y=cx+d$, and $x>x1$.

It should be noted that the estimated direction of the tag to be positioned relative to the reference tag is only approximately estimated in the foregoing. However, the finally positioned position of the tag to be positioned is not necessarily on a straight line where an estimated direction of a certain reference tag lies.

Figure 3:
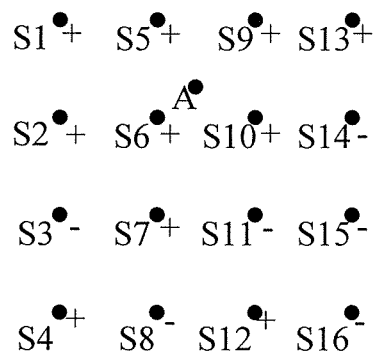
FIG. 3 is a schematic diagram of symbol correction in an embodiment of the present invention.

It should be additionally noted that, in actual application, after the value of the M of each RF reader is computed, it might be found that the boundary is not very clear. For example, in a certain area, values of the M of most RF readers are positive, but values of the M computed by several RF readers are negative. In this case, values of the M of a few RF readers may be rectified, and may be modified to be a situation of the positive and negative values of the M computed by most RF readers around the few RF readers. For example, the situation of the positive and negative values of the M computed by each RF reader is shown in FIG. 3. In this case, "−" at S3 may firstly be modified into "+", and "+" at S12 may be modified into "−". Then the boundary of the RF readers is determined, so as to ensure symbols on one side of the boundary are all the same as much as possible, thereby forming the area of positive values and the area of negative values through dividing.

After the estimated direction of the tag to be positioned relative to each reference tag is determined, according to each estimated direction and according to the specified number of reference tags, a valid reference tag group may be selected, so as to perform multipoint positioning. For example, three-point positioning may be adopted, that is, the specified number of reference tags is three. The so-called three-point positioning means that three valid reference tags are firstly selected, and it is considered that a tag to be positioned is located in a triangular area using the three valid reference tags as vertexes, and a certain algorithm may be used to compute a position where the tag to be positioned is located. Therefore, how to select a valid reference tag group to be positioned is the key of the positioning.

Figure 4A:
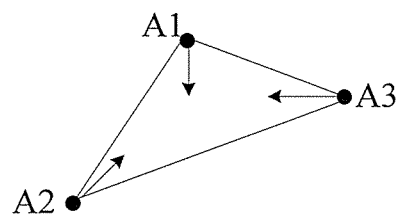
FIGS. 4(a) and 4(b) are schematic diagrams of a method for selecting a valid reference tag group in an embodiment of the present invention.
Figure 4B:
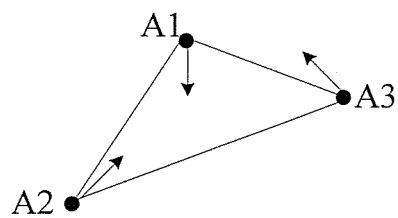

In the embodiment of the present invention, the following may be performed: After the estimated direction of the tag to be positioned relative to each reference tag is determined, every three reference tags are combined to form multiple reference tag groups to be determined. For every reference tag group to be determined, three reference tags in the group are used as vertexes to form a triangle. It is judged whether estimated directions determined for the three reference tags all point to the inside of the triangle. If yes, the three reference tags can form a valid reference tag group. For example, as shown in FIG. 4(a), it is assumed that A1, A2, and A3 are three reference tags, and estimated directions which are of a tag to be positioned and are estimated for the three reference tags are shown in the figure. It may be seen that the three estimated directions all point to the inside of the triangle. Therefore, the reference tags A1, A2, and A3 form a valid reference tag group. Otherwise, if an estimated direction which is of the tag to be positioned and is estimated for a certain reference tag points to the outside of the triangle, the three reference tags cannot form a valid reference tag group. As shown in FIG. 4(b), likewise, it is assumed that A1, A2, and A3 are three reference tags, and the estimated directions which are of a tag to be positioned and are estimated for the three reference tags are shown in the figure. It may be seen that the estimated direction which is of the tag to be positioned and is estimated for the reference tag A3 points to the outside of the triangle. Therefore, the reference tags A1, A2, and A3 cannot form a group of valid reference tags.

In this way, multiple valid reference tag groups may finally be selected. In this case, an optimal valid reference tag group may be selected from them as a valid reference tag group used in final positioning. Specifically, when the optimal valid reference tag group is selected, a Euclidean distance E between every two reference tags in every valid reference tag group may be computed, and a group with the smallest average value of Es or the smallest sum of Es is finally selected as the optimal valid reference tag group, and this group of valid reference tags are used to finally position the position of the tag to be positioned.

Such selection is performed because if an average value of Es or a sum of Es in a certain group of valid reference tags is the smallest, it is proved that an area of a polygon formed by using these valid reference tags as vertexes is the smallest. To perform positioning in the smallest area may improve positioning accuracy.

Two specific computation processes related to the foregoing description are briefly introduced in the following.

Firstly, a specific algorithm about three-point positioning may be implemented by adopting a manner in the prior art. For example, it is assumed that the three reference tags in the valid reference tag group are B1, B2, and B3, and their coordinates are $(x_1, y_1)$, $(x_9, y_2)$ and $(x_3, y_3)$, respectively. Similarity factors between a tag to be positioned and these reference tags (weights of the reference tags relative to the tag to be positioned) are computed and are $w_1$, $w_2$, and $w_3$ (similarity factors computed by different algorithms might be different), respectively. In this way, an abscissa of the tag to be positioned is $x=(w_1 \times x_1 + w_2 \times x_2 + w_3 \times x_3)/(w_1+w_2+w_3)$, and an ordinate is obtained similarly. If the weights are normalized, that is, $w_1+w_2+w_3=1$, $x=(w_1 \times x_1 + w_2 \times x_2 + w_3 \times x_3)$. Generally, the weights may be normalized by default.

The so-called similarity factors between the tag to be positioned and the reference tags are equivalent to the weights of the reference tags relative to the tag to be positioned, that is, degrees of importance of the reference tags for positioning the tag to be positioned. Generally, the weights are relevant to distances between the reference tags and the tag to be positioned, and are in inverse proportion to the distances. That is, the closer the distances between the reference tags and the tag to be positioned are, the higher the weights are. On the contrary, the farther the distances between the reference tags and the tag to be positioned are, the lower the weights are. Definitely, before a specific position of the tag to be positioned is obtained, exact values of the distances between the reference tags and the tag to be positioned cannot be obtained. Therefore, Euclidean distances between the reference tags and the tag to be positioned may be computed with one algorithm. Though the Euclidean distances are not physical distances between the reference tags and the tag to be positioned, the Euclidean distances may reflect the physical distances between the reference tags and the tag to be positioned. The weight of each reference tag may be computed according to the Euclidean distances.

For example, it is assumed that totally n RF readers and m reference tags exist, and it is assumed that a signal strength vector of a tag to be positioned is $\theta=(\theta_1, \theta_2 \ldots \theta_n)$, and $\theta_i$ represents signal strength which is of the tag to be positioned and is received by an RF reader i. A signal strength vector of a reference tag is $S=(S_1, S_2 \ldots S_n)$, where $S_i$ represents signal strength which is of the reference tag and is received by the RF reader i. And then a Euclidean distance between the reference tag and the tag to be positioned may be represented as:

$$E_j = \sqrt{\sum_{i=1}^{n} (\theta_i - S_i)^2} \quad j \in (1, m) \tag{1}$$

The foregoing formula (1) may represent the Euclidean distance between the reference tag and the tag to be positioned, where it is represented that the smaller the value of E is, the closer the distance between the reference tag and the tag to be positioned is. On the contrary, the larger the value of E is, the farther the distance between the reference tag and the tag to be positioned is.

Next, according to the value of E, a weight of the reference tag may be computed as:

$$w_j = \frac{1}{E_j^2} / \left( \sum_{j=1}^{k} \frac{1}{E_j^2} \right) \tag{2}$$

In the foregoing formula, k represents k reference tags used for the positioning. For example, when three-point positioning is performed, a value of k is 3, and $E_j$ is Euclidean distances between the k reference tags used for the positioning and the tag to be positioned.

Then, coordinates of the tag to be positioned may be computed according to the following formula:

$$(x, y) = \sum_{i=0}^{k} w_i (x_i, y_i) \tag{3}$$

Besides, for a Euclidean distance between two reference tags, reference may be made to the foregoing description for the method of computing the Euclidean distance between the reference tag and the tag to be positioned. For example, the Euclidean distance may be obtained through computation with the following formula. It is assumed that totally n RF readers exist, and it is assumed that a signal strength vector of a reference tag A is $S=(S_1, S_2, \ldots S_n)$, where $S_i$ represents signal strength which is of the reference tag A and is received by the RF reader i, and $i \in (1, n)$. It is assumed that a signal strength vector of a reference tag B is $P=(P_1, P_2 \ldots P_n)$, where $P_i$ represents signal strength which is of the reference tag B and is received by the RF reader i, and $i \in (1, n)$. A Euclidean distance between the reference tag A and the reference tag B may be represented as:

$$E_{AB} = \sqrt{\sum_{i=1}^{n} (P_i - S_i)^2} \tag{4}$$

In another embodiment of the present invention, if a certain tag to be positioned is located at an edge of the network, and when a valid reference tag group is determined by using the method provided in the embodiment of the present invention, a situation that all tag groups are invalid may also exist. For example, still taking three-point positioning as an example, the following situation may exist: Every three reference tags in all the reference tags are combined. However, it is finally found that a reference tag with an estimated direction pointing to the outside of the triangle exists in every combination. This is generally because the tag to be positioned is located at the edge of the network. In this case, if the three-point positioning method is still adopted to determine a position of the tag to be positioned, the finally determined position of the tag to be positioned is probably inaccurate.

For this situation, the embodiment of the present invention also provides a corresponding solving method. That is, when a valid reference tag group is selected according to a specified number, if the valid reference tag group does not exist, a manner of reducing the number of reference tags may be adopted to perform positioning. For example, a three-point positioning manner is adopted in a default situation. However, when it is found that no matter which three reference tags are invalid, a two-point positioning manner may be adopted. Or, a four-point positioning manner is adopted in a default situation. However, when it is found that no which four reference tags are invalid, the three-point positioning manner may be adopted to perform the positioning again. If it is found that the positioning still cannot be done by using the three-point positioning, the two-point positioning manner is adopted.

For the two-point positioning, since two reference tags cannot form a polygon, the method for selecting a valid reference tag group and the specific positioning method are different from the methods adopted during three-point positioning or positioning based on more than three points, which are introduced here in the following.

Firstly, the weights of each reference tag relative to the tag to be positioned may be computed according to the formula (1) and the formula (2), and then two reference tags with the weights satisfying a preset condition are selected from them to form a valid reference tag group. For example, two reference tags with the largest weights may be selected to form the valid reference tag group.

After the valid reference tag group is selected, a functional relation may be obtained according to coordinates and weights of the two reference tags, and an inverse proportional relationship between the known weights and the distances, where the distances refer to physical distances between the reference tags and the tag to be positioned. For example, it is assumed that the two reference tags in the valid reference tag group are A and B, and the coordinates of both of them are known and are $(x_1,y_1)$ and $(x_2,y_2)$, respectively, and it is assumed that weights of the reference tags A and B are $w_1$ and $w_2$, respectively. Coordinates of the tag to be positioned are unknown, and are set as (x,y), then a distance between the reference tag A and the tag to be positioned may be represented as $b_1=\sqrt{(x-x_1)^2+(y-y_1)^2}$, and a distance between the reference tag B and the tag to be positioned may be represented as $b_2=\sqrt{(x-x_2)^2+(y-y_2)^2}$. In this way, according to the foregoing inverse proportional relationship between the weights and the distances, the following functional relation may be obtained:

$$b_1/b_2=w_2/w_1 \quad (5)$$

that is, $$w_1\sqrt{(x-x_1)^2+(y-y_1)^2}=w_2\sqrt{(x-x_2)^2+(y-y_2)^2} \quad (6)$$

It should be noted that after the valid reference tag group is determined, in the foregoing functional relation, only x and y are unknown numbers, and the others are all known numbers.

And then, according to the functional relation and the estimated directions previously obtained for the two reference tags, the position of the tag to be positioned may be determined. Specifically, it is assumed that a functional relation of a straight line where the estimated direction of the reference tag A lies is:

$$y=c_1x+d_1 \quad (7)$$

and a functional relation of a straight line where the estimated direction of the reference tag B lies is:

$$y=c_2x+d_2 \quad (8)$$

In this way, the functional relations (6) and (7), and (6) and (8) are associated, respectively, and are solved to obtain a pair of values of x and y, respectively. For example, the values are $(x_3,y_3)$ and $(x_4,y_4)$ respectively, which correspond to two points in a coordinate system. Then a midpoint of a line segment using the two points as endpoints may be obtained, and the midpoint is used as a finally determined position of the tag to be positioned.

Figure 5:
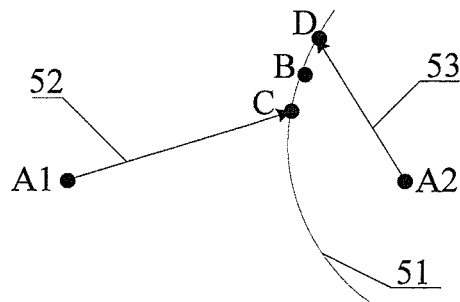
FIG. 5 is a schematic diagram of a two-point positioning method in an embodiment of the present invention.

In order to understand the foregoing two-point positioning method better, the two-point positioning method is more vividly introduced through FIG. 5 in the following.

For example, it is assumed that the valid reference tag group is formed by reference tags A1 and A2. Coordinates of A1 and A2 and weights are brought into the formula (6) to obtain a functional relation, and a curve 51 may be drawn according to the functional relation. Meanwhile, it is assumed that a radial where an estimated direction which is of the tag to be positioned and is determined for the reference tag A1 lies is 52, and a radial where an estimated direction which is of the tag to be positioned and is determined for the reference tag A2 lies is 53. The radials 52 and 53 have a point of intersection with the curve 51, respectively, and the points of intersection are C and D, respectively. Then a midpoint B of a line segment using the points C and D as endpoints is used as a position where the tag to be positioned is located.

In two-point positioning, the foregoing manner is adopted because of the following reasons:

According to a Euclidean principle, in a plane, two unparallel straight lines have but only one point of intersection. Only one straight line passes through two given points. In this way, when the tag to be positioned and the two reference tags are in one plane, only one straight line m passes through the tag to be positioned and the reference tag A, and only one straight line n passes through the tag to be positioned and the other reference tag B. The straight lines m and n have but only one point of intersection, and this point of intersection is definitely a point where the tag to be positioned is located.

Therefore, if an accurate direction relationship between the tag to be positioned and the two reference tags can be obtained, and additionally, accurate positions of the two reference tags are known, m and n may be accurately drawn (only the function expressions of m and n need to be obtained in actual computation), so that the point of intersection of them is obtained, that is, the position where the tag to be positioned is located.

In the embodiment of the present invention, since only an approximate direction relationship between the tag to be positioned and the two reference tags can be known, it is obviously incorrect to directly take the point of intersection of the two straight lines to determine the position of the tag to be positioned. Therefore, in the embodiment of the present invention, the relationship that "the weights and the distances are in an inverse proportion" is used to finally determine the position of the tag to be positioned. In this way, the positioning accuracy may be improved.

Figure 6:
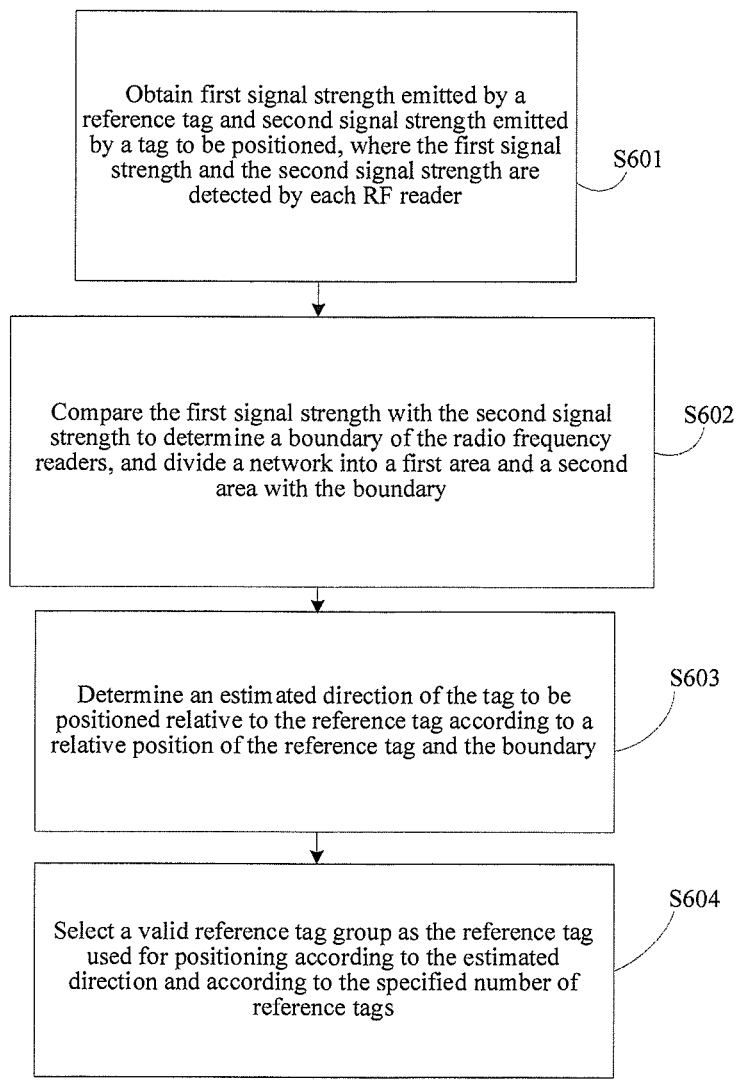
FIG. 6 is a flow chart of a method for selecting a reference tag used for positioning according to an embodiment of the present invention.

To sum up, referring to FIG. 6, a method for selecting a reference tag used for positioning according to an embodiment of the present invention includes the following steps:

S601: Obtain first signal strength emitted by a reference tag and second signal strength emitted by a tag to be positioned, where the first signal strength and the second signal strength are detected by each RF reader.

S602: Compare the first signal strength with the second signal strength to determine a boundary of radio frequency readers, and divide a network into a first area and a second area with the boundary.

S603: Determine an estimated direction of the tag to be positioned relative to the reference tag according to a relative position of the reference tag and the boundary.

When the estimated direction of the tag to be positioned relative to the reference tag is determined according to the relative position of the reference tag and the boundary, a direction perpendicular to the boundary and pointing to the second area may be determined as the estimated direction of the tag to be positioned relative to the reference tag.

S604: According to the estimated direction and according to the specified number of reference tags, select a valid reference tag group as the reference tag used for positioning.

In the specific implementation, the valid reference tag group may be selected firstly according to the specified number of reference tags. For example, the specified number of valid reference tags is three, which is equivalent to performing three-point positioning. Therefore, a valid reference tag group forming by three reference tags is to be selected.

When the valid reference tag group is selected according to the specified number of reference tags, multiple valid reference tag groups may be selected. In this case, an optimal valid reference tag group may further be selected. Specifically, the optimal valid reference tag group may be selected according to a Euclidean distance E between every two reference tags in the valid reference tag groups. For example, a group with the smallest average value of Es or the smallest sum of Es may be selected as the optimal valid reference tag group, and this group of valid reference tags is used to finally determine a position of the tag to be positioned.

Definitely, when the valid reference tag group is selected according to the specified number of reference tags, a situation that all reference tag groups are invalid may also exist. In this case, in the embodiment of the present invention, the specified number of reference tags may be reduced, and a valid reference tag group may be selected according to the number of reference tags after reducing.

Specifically, when the valid reference tag group is selected, if the number of reference tags in a pre-selected valid reference tag group is greater than or equal to three, that is, three-point positioning or multipoint positioning based on more than three points needs to be performed, the positioning may be performed in the following manner: According to the number of reference tags in the pre-selected valid reference tag group, reference tags are selected to form a reference tag group to be determined. It is judged whether the estimated directions determined for each reference tag in the reference tag group to be determined all point to the inside of a polygon using each reference tag as a vertex. If yes, the reference tag group to be determined is the valid reference tag group.

If the number of reference tags in the pre-selected valid reference tag group is two, that is, two-point positioning needs to be performed, a valid reference tag group may be selected in the following manner: The weight of each reference tag relative to the tag to be positioned is computed, and two reference tags with weights satisfying a preset condition (for example, being the largest) are selected to form the valid reference tag group.

After the valid reference tag group is selected, the valid reference tag group may be used to perform multipoint positioning, so as to determine the position of the tag to be positioned.

When three-point positioning or multipoint positioning based on more than three points is performed, a method in the prior art may be adopted to determine the position of the tag to be positioned.

When two-point positioning is performed, the following method may be adopted:

associating equations (6) and (7) to obtain a first equation set, and solving the first equation set to obtain a solution as coordinates of a point;

associating equations (6) and (8) to obtain a second equation set, and solving the second equation set to obtain another solution as coordinates of another point; and taking a midpoint position of a line segment using the two points as endpoints as the position of the tag to be positioned.

To sum up, according to a tag positioning method in a wireless sensor network provided in the embodiment of the present invention, the estimated direction of the tag to be positioned relative to each reference tag may be used to perform the selection, and then the valid reference tag group may be used to position the tag to be positioned. Therefore, this positioning manner does not depend on deployment density of the reference tag. Even in a situation that the deployment density of the reference tag is relatively low, relatively high positioning accuracy may still be achieved.

Figure 7:
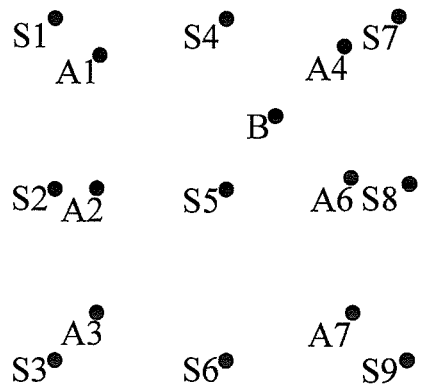
FIG. 7 is a diagram of experimental network deployment in an embodiment of the present invention.
Figure 8:
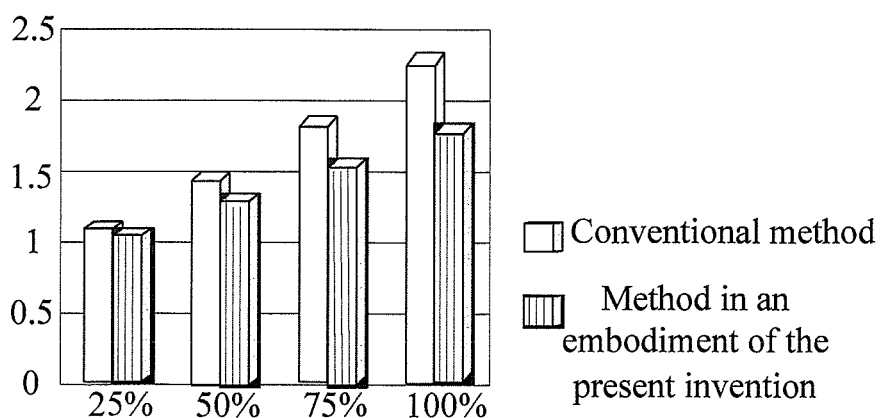
FIG. 8 is a schematic diagram of a comparison between positioning accuracy in an embodiment of the present invention and that of a conventional method in a situation that reference tags are sparsely deployed.

The description of the foregoing effects may be proved through a simulation result in a laboratory. As shown in FIG. 7, it is a deployment diagram of a simulated environment, where the number of RF readers is 9, ranging from S1 to S9, and the number of reference tags is 6, ranging from A1 to A6, and B is a tag to be positioned. The RF readers form a 3*3 grid with spacing of 2 meters. Through experiments, the following conclusion may be obtained:

For a situation that the reference tags are relatively sparse, the positioning accuracy in the embodiment of the present invention has a relatively obvious advantage over that of a conventional positioning method. A comparison result is shown in FIG. 8. In FIG. 8, an ordinate represents a positioning error, that is, a difference between the position which is of the tag to be positioned and is determined by using a positioning algorithm, and an actual position of the tag to be positioned. An abscissa represents a distribution situation of positioning error values in multiple experiments. It may be seen in FIG. 8, all situations that a positioning error occurs in each experiment are selected, and it is found through statistics that the positioning errors have the following characteristic: For the conventional positioning method, every positioning error is less than 2.3, where 75% are less than 1.9, 50% are less than 1.5, and 25% are less than 1.2. For the method in the embodiment of the present invention, every positioning error is less than 1.8, where 75% are less than 1.6, 50% are less than 1.3, and 25% are less than 1.1. It may be seen that at each level, the positioning error in the embodiment of the present invention is less than the positioning error of the conventional positioning method, and the advantage is relatively obvious.

Figure 9:
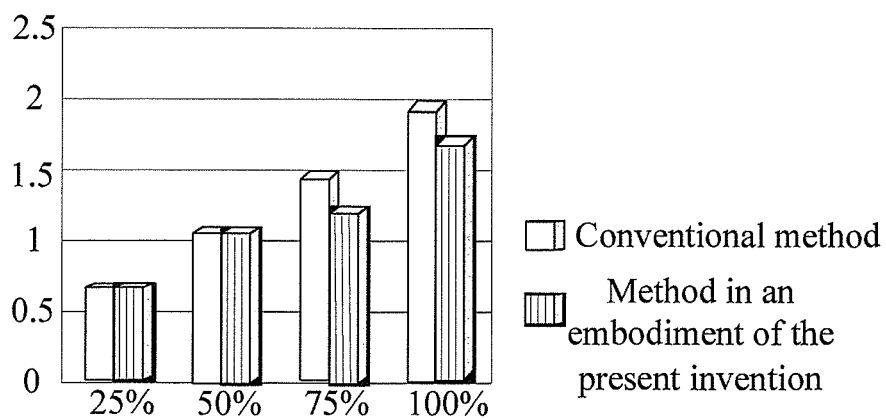
FIG. 9 is a schematic diagram of a comparison between positioning accuracy in an embodiment of the present invention and that of a conventional method in a situation that reference tags are densely deployed.

For a situation that the reference tags are dense, a comparison result is shown in FIG. 9. It may be seen that the positioning accuracy in the embodiment of the present invention is equivalent to that of the conventional positioning method. However, it may be seen from a comparison between FIG. 8 and FIG. 9, for the method in the embodiment of the present invention, the positioning errors occurring when the reference tags are sparse is almost as many as that occurring when the reference tags are dense. It may be seen that distribution density of the reference tags has a relatively small influence on the method in the embodiment of the present invention.

Figure 10:
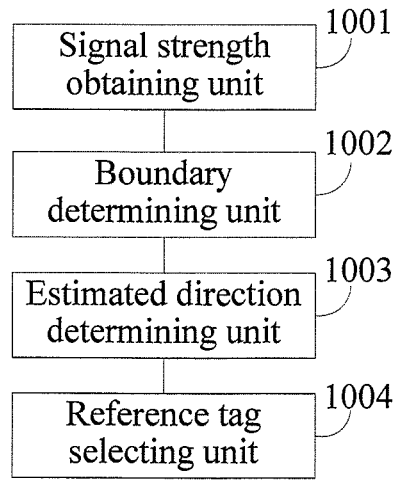
FIG. 10 is a schematic diagram of a first apparatus according to an embodiment of the present invention.

Corresponding to the method for selecting a reference tag used for positioning provided in the embodiment of the present invention, an embodiment of the present invention also provides an apparatus for selecting the reference tag used for positioning. Referring to FIG. 10, the apparatus includes:

a signal strength obtaining unit 1001, configured to obtain first signal strength emitted by a reference tag and second signal strength emitted by a tag to be positioned, where the first signal strength and the second signal strength are detected by each radio frequency reader;

a boundary determining unit 1002, configured to compare the first signal strength with the second signal strength to determine a boundary of radio frequency readers, and divide a network into a first area and a second area with the boundary;

an estimated direction determining unit 1003, configured to determine an estimated direction of the tag to be positioned relative to the reference tag according to a relative position of the reference tag and the boundary; and a reference tag selecting unit 1004, configured to, according to the estimated direction and according to the specified number of reference tags, select a valid reference tag group as the reference tag used for positioning.

Figure 11:
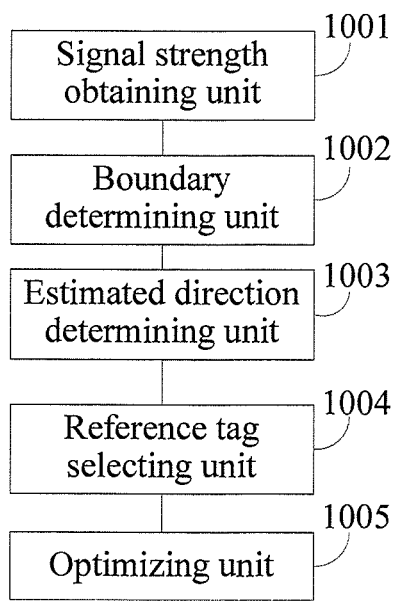
FIG. 11 is a schematic diagram of a second apparatus according to an embodiment of the present invention.

If multiple valid reference tag groups exist when the valid reference tag group is selected according to the specified number of reference tags, referring to FIG. 11, the apparatus also includes:

an optimizing unit 1005, configured to, according to a Euclidean distance between every two reference tags in the valid reference tag group, select an optimal valid reference tag group as the reference tag used for positioning.

Figure 12:
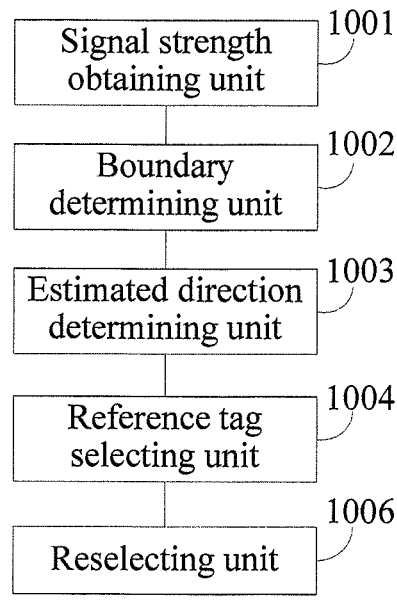
FIG. 12 is a schematic diagram of a third apparatus according to an embodiment of the present invention.

If the valid reference tag group does not exist when the valid reference tag group is selected according to the specified number of reference tags, referring to FIG. 12, the apparatus may also include:

a reselecting unit 1006, configured to reduce the specified number of reference tags and according to the number of reference tags after reducing, select a valid reference tag group as the reference tag used for positioning.

Figure 13:
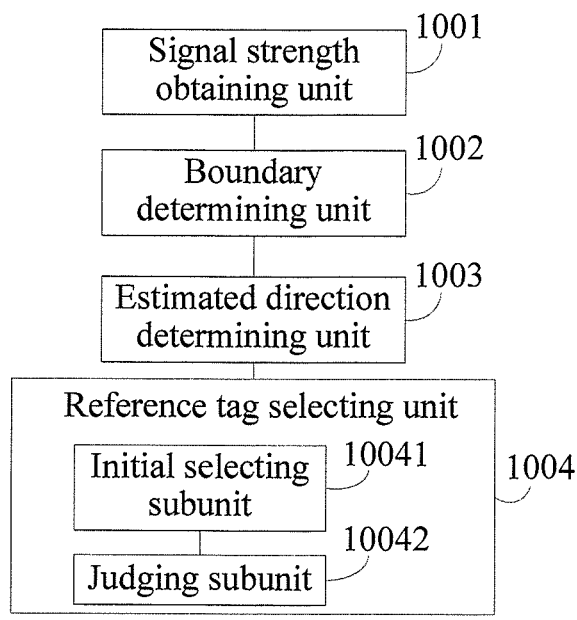
FIG. 13 is a schematic diagram of a fourth apparatus according to an embodiment of the present invention.

If the number of reference tags in a pre-selected valid reference tag group is greater than or equal to three, that is, three-point positioning or multipoint positioning based on more than three points is performed, referring to FIG. 13, the reference tag selecting unit 1004 may include the following subunits:

an initial selecting subunit 10041, configured to, according to the number of reference tags in the pre-selected valid reference tag group, select reference tags to form a reference tag group to be determined; and a judging subunit 10042, configured to judge whether the estimated directions determined for each reference tag in the reference tag group to be determined all point to the inside of a polygon using each reference tag as a vertex, and if yes, the reference tag group to be determined is the valid reference tag group.

Figure 14:
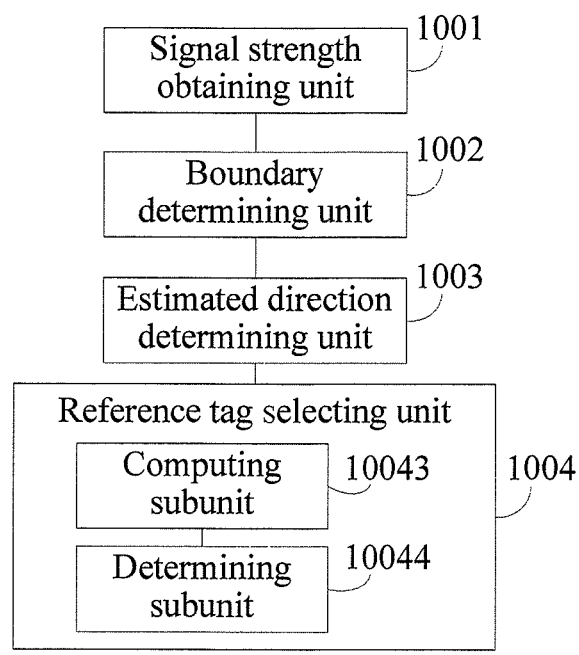
FIG. 14 is a schematic diagram of a fifth apparatus according to an embodiment of the present invention.

If the number of reference tags in the pre-selected valid reference tag group is two, referring to FIG. 14, the reference tag selecting unit 1004 includes:

a computing subunit 10043, configured to compute a weight of each reference tag relative to the tag to be positioned; and a determining subunit 10044, configured to select two reference tags with weights satisfying a preset condition to form a valid reference tag group.

In the specific implementation, if the reference tag is located in the first area, the estimated direction determining unit 1003 may be specifically configured to: determine a direction perpendicular to the boundary and pointing to the second area as the estimated direction of the tag to be positioned relative to the reference tag.

In the apparatus for selecting the reference tag used for positioning provided in the embodiment of the present invention, firstly, the estimated direction of the tag to be positioned relative to each reference tag may be determined, then when the valid reference tag group is selected, the estimated direction of the tag to be positioned relative to each reference tag may be used to perform the selection, and then the valid reference tag group may be used to position the tag to be positioned. Therefore, for the position of the tag to be positioned, where the position is positioned by the reference tag obtained by using this reference tag selecting method, its positioning accuracy does not depend on deployment density of the reference tag. That is, even if in a situation where the deployment density of the reference tags is relatively low, relatively high positioning accuracy can still be achieved.

The method in the embodiment of the present invention may be executed by a universal integrated circuit (for example, a central processing unit CPU) or an application specific integrated circuit (ASIC). The apparatus, modules, and units in the embodiment of the present invention may be the universal integrated circuit (for example, the central processing unit CPU) or the application specific integrated circuit (ASIC).

Persons of ordinary skill in the art may understand that all or a part of the steps of the method according to the foregoing embodiments may be implemented by a program instructing relevant hardware. The program may be stored in a computer readable storage medium. When the program runs, the following steps are included: obtaining first signal strength emitted by a reference tag and second signal strength emitted by a tag to be positioned, where the first signal strength and the second signal strength are detected by each radio frequency reader; comparing the first signal strength with the second signal strength to determine a boundary of the radio frequency readers, and dividing a network into a first area and a second area with the boundary; determining an estimated direction of the tag to be positioned relative to the reference tag according to a relative position of the reference tag and the boundary; and according to the estimated direction and according to the specified number of reference tags, selecting a valid reference tag group as the reference tag used for positioning. The storage medium may be a ROM/RAM, a magnetic disk, or a compact disk.

The method and the apparatus for selecting the reference tag used for positioning provided in the present invention are introduced in detail in the foregoing. The principle and the implementation manner of the present invention are described here by using specific examples. The description about the foregoing embodiments is merely used to help understand the method and the core ideas of the present invention. Meanwhile, persons of ordinary skill in the art can make variations to the present invention in terms of the specific implementation manners and application scopes based on the ideas of the present invention. In conclusion, the content of the specification shall not be understood as a limitation to the present invention.

What is claimed is:

1. A method for selecting a reference tag used for positioning, the method comprising:

obtaining a first signal strength of a signal emitted by a reference tag of a plurality of reference tags and a second signal strength of a signal emitted by a tag to be positioned, wherein the first signal strength and the second signal strength are detected by each radio frequency reader of a plurality of radio frequency readers;

comparing the first signal strength with the second signal strength detected by each of the plurality of radio frequency readers to produce a corresponding signal strength difference and to determine a boundary of each radio frequency reader, and dividing a network into a first area and a second area with the boundary, wherein the reference tag is disposed within the first area and the first area includes a first plurality of radio frequency readers having a positive signal strength difference value, and the tag to be positioned is disposed within the second area and the second area includes a second plurality of radio frequency readers having a negative signal strength difference value;

determining an estimated direction of the tag to be positioned relative to the reference tag according to a relative position of the reference tag and the boundary; and according to the estimated direction and a number of reference tags used to form a reference tag group, selecting a valid reference tag group from the plurality of reference tags and using the selected valid reference tag group for positioning the tag to be positioned.

2. The method according to claim 1, wherein in response to multiple valid reference tag groups existing, selecting the valid reference tag group for positioning comprises:

selecting the valid reference tag group according to a Euclidean distance between every two reference tags in each of the multiple valid reference tag groups.

3. The method according to claim 1, wherein in response to the valid reference tag group not existing, selecting the valid reference tag group for positioning comprises:

reducing the number of reference tags in the reference tag group, and according to the reduced number of reference tags in the reference tag group, selecting the valid reference tag group for positioning.

4. The method according to claim 1, wherein when the number of reference tags in a pre-selected valid reference tag group is greater than or equal to three, selecting the valid reference tag group according to the estimated direction and the number of reference tags comprises:

according to the number of the reference tags in the pre-selected valid reference tag group, selecting reference tags and forming a reference tag group to be determined; and determining whether an estimated direction determined for each reference tag in the reference tag group to be determined points to the inside of a polygon using each reference tag as a vertex, and if yes, determining the reference tag group to be determined as the valid reference tag group.

5. The method according to claim 1, wherein when the number of reference tags in a pre-selected valid reference tag group is two, selecting the valid reference tag group according to the estimated direction and the specified number of reference tags comprises:

computing a weight of each reference tag relative to the tag to be positioned; and selecting two reference tags with weights satisfying a preset condition to form the valid reference tag group.

6. The method according to claim 5, wherein when the number of the reference tags in the pre-selected valid reference tag group is two, determining a position of the tag to be positioned according to the following manner:

solving $$\begin{cases} w_1\sqrt{(x-x_1)^2+(y-y_1)^2} = w_2\sqrt{(x-x_2)^2+(y-y_2)^2} \\ y = c_1 x + d_1 \end{cases}$$

to obtain coordinates of a first point;

solving $$\begin{cases} w_1\sqrt{(x-x_1)^2+(y-y_1)^2} = w_2\sqrt{(x-x_2)^2+(y-y_2)^2} \\ y = c_2 x + d_2 \end{cases}$$

to obtain coordinates of a second point; and determining a midpoint position of a line segment using the first point and the second point as endpoints as the position of the tag to be positioned, wherein:

$w_1$ is a weight of a first reference tag in the valid reference tag group relative to the tag to be positioned;

$w_2$ is a weight of a second reference tag in the valid reference tag group relative to the tag to be positioned;

$x_1$ is an abscissa of the first reference tag;

$y_1$ is an ordinate of the first reference tag;

$x_2$ is an abscissa of the second reference tag;

$y_2$ is an ordinate of the second reference tag;

$y=c_1 x+d_1$ is a functional relation of a straight line where the estimated direction that is determined for the first reference tag lies, and $c_1$ and $d_1$ are real numbers; and $y=c_2 x+d_2$ is a functional relation of a straight line where the estimated direction that is determined for the second reference tag lies, and $c_2$ and $d_2$ are real numbers.

7. The method according to claim 1, wherein determining the estimated direction of the tag to be positioned relative to the reference tag according to the relative position of the reference tag and the boundary comprises:

determining a direction perpendicular to the boundary and pointing to the second area as the estimated direction of the tag to be positioned relative to the reference tag.

8. An apparatus for selecting a reference tag used for positioning, the apparatus comprising:

a processor; and memory coupled to the processor including instructions that, when executed by the processor, cause the apparatus to:

obtain a first signal strength of a signal emitted by a reference tag of a plurality of reference tags and a second signal strength of a signal emitted by a tag to be positioned, wherein the first signal strength and the second signal strength are detected by each radio frequency reader of a plurality of radio frequency readers;

compare the first signal strength with the second signal strength detected by each of the plurality of radio frequency readers to produce a corresponding signal strength difference and to determine a boundary of each radio frequency reader, and divide a network into a first area and a second area with the boundary, wherein the reference tag is disposed within the first area and the first area includes a first plurality of radio frequency readers having a positive signal strength difference value, and the tag to be positioned is disposed within the second area and the second area includes a second plurality of radio frequency readers having a negative signal strength difference value;

according to a relative position of the reference tag and the boundary, determine an estimated direction of the tag to be positioned relative to the reference tag; and according to the estimated direction and a number of reference tags used to form a reference tag group, select a valid reference tag group from the plurality of reference tags and use the selected valid reference tag group for positioning the tag to be positioned.

9. The apparatus according to claim 8, further including instructions that, when executed by the processor, cause the apparatus to, in response to multiple valid reference tag groups existing:

select the valid reference tag group according to a Euclidean distance between every two reference tags in each of the multiple valid reference tag groups.

10. The apparatus according to claim 8, further including instructions that, when executed by the processor, cause the apparatus to, in response to the valid reference tag group not existing:

reduce the number of reference tags in the reference tag group, and according to the reduced number of reference tags in the reference tag group, select a valid reference tag group for positioning.

11. The apparatus according to claim 10, further including instructions that, when executed by the processor, cause the apparatus to, when the number of reference tags in a preselected valid reference tag group is greater than or equal to three:

according to the number of the reference tags in the preselected valid reference tag group, select reference tags to form a reference tag group to be determined; and determine whether an estimated direction determined for each reference tag in the reference tag group to be determined points to the inside of a polygon using each reference tag as a vertex, and if yes, determine the reference tag group to be determined as the valid reference tag group.

12. The apparatus according to claim 10, further including instructions that, when executed by the processor, cause the apparatus to, when the number of reference tags in a preselected valid reference tag group is two:

compute a weight of each reference tag relative to the tag to be positioned; and select two reference tags with weights satisfying a preset condition to form the valid reference tag group.

13. The apparatus according to claim 10, further including instructions that, when executed by the processor, cause the apparatus to determine a direction perpendicular to the boundary and pointing to the second area as the estimated direction of the tag to be positioned relative to the reference tag.

* * * * *